United States Patent [19]
Kurita et al.

[11] Patent Number: 4,559,319

[45] Date of Patent: Dec. 17, 1985

[54] CURING AGENT COMPOSITION FOR SILICONE ELASTOMERS

[75] Inventors: Akitsugu Kurita; Tetsuo Fujimoto, both of Ohta, Japan

[73] Assignee: Toshiba Silicone Co., Ltd., Tokyo, Japan

[21] Appl. No.: 711,863

[22] Filed: Mar. 14, 1985

[30] Foreign Application Priority Data

Mar. 26, 1984 [JP] Japan ............................ 59-57765

[51] Int. Cl.$^4$ ............................................ B01J 31/12
[52] U.S. Cl. ................................. 502/156; 502/152; 528/18; 528/33; 528/901
[58] Field of Search ............................. 502/156, 152

[56] References Cited

U.S. PATENT DOCUMENTS 3,194,770  7/1965  Hostettler ........................ 502/156

FOREIGN PATENT DOCUMENTS 31800  3/1978  Japan ................................ 502/152

*Primary Examiner*—Patrick P. Garvin
*Attorney, Agent, or Firm*—Gary L. Loser

[57] ABSTRACT

A curing agent composition for silicone elastomers, comprising an organic tin compound which is solubilized in water with the use of a nonionic surfactant selected from the group consisting of polyoxyethylene sorbitol fatty acid esters and polyoxyethylene sorbitan fatty acid esters and a polyvalent alcohol.

3 Claims, No Drawings

CURING AGENT COMPOSITION FOR SILICONE ELASTOMERS

The present application claims priority of Japanese patent application Ser. No. 84/57765 filed Mar. 26, 1984.

BACKGROUND OF THE INVENTION

The present invention relates to deep section curing agent compositions for condenstion curable silicone elastomers.

In the prior art, condensation curable silicone elastomers, for example, compositions comprising a hydroxyl group-containing polyorganosiloxane and an alkyl silicate as the main components have been known to be curable within several hours to 24 hours at about room temperature with the use of a curing agent such as an organic tin compound. The cured products obtained exhibit excellent electrical properties, heat resistance and chemical properties, and therefore have been utilized widely for various kinds of applications such as for potting, for a master mold, and the like.

However, since curing of such condensation curable silicone elastomers proceeds gradually from the surface to the inner portion, it takes a disadvantageously long time to ensure curing to the bottom portion when the elastomer has a depth of several centimeters from the surface.

In order to overcome such disadvantage, there have been proposed a composition containing a polyorganosiloxane comprising $(CH_3)_3SiO_{\frac{1}{2}}$ and $SiO_2$ units, a polyorganohydrogen siloxane and a metal oxide (Japanese Patent Publication No. 11982/1971), a composition containing a water-soluble silane or siloxane (Japanese Patent Publication No. 19616/1972), a composition containing a water-soluble polyvalent alcohol or its derivative having hydroxyl groups (Japanese Patent Publication No. 8461/1973) and a composition containing glycerophosphoric acid or its metal salt (Japanese Patent Publication No. 23977/1976). However, these compositions involved disadvantages such as the additive added for curing the deep section had a deleterious effect on the stability of the silicone composition capable of being cured to an elastic state by addition of the curing agent (hereinafter called the silicone composition) or that curability of the deep section was not sufficient.

It has also been proposed to accelerate the curing speed by use of an organic tin compound in which hydroxyl groups are bonded to tin atoms such as hydroxylated dimethyltin oleate (Japanese Patent Publications Nos. 44983/1972 and 44984/1972), and this system is also known to be excellent in deep section curability. However, this curing agent involves the disadvantages that its manufacturing steps are complicated and gives products with qualities varying greatly from lot to lot, that stability is not good and, moreover, that there is a limitation in its applications due to its toxicity.

Accordingly, there has now been made a discovery in the method by which deep section curability can be imparted by the curing agent, while employing a tin compound conventionally used as the curing agent, and without impairing the stability of the silicone composition. That is, the curing agent compositions as disclosed in Japanese Patent Publication Nos. 951/1969 and 29878/1976 have been known. However, the curing agent composition of the former, comprising a tin salt of an organic carboxylic acid, water and a common solvent for these selected from alkanols and alkane phosphonates can be dispersed and mixed into the silicone composition with difficulty. On the other hand, the curing agent composition of the latter, comprising a lipophilic surfactant, water and an organic tin compound into a W/O type emulsion, cannot give sufficient deep section curability, because water can be formulated in a large amount with difficulty. For obtaining sufficient deep section curability, it is necessary to formulate a large amount of said curing agent composition, which, however, results also in an increased amount of the tin compound added, whereby there results the problem of extremely shortened working time. Further, when said composition is stored over a prolonged time, separation will occur between the water and the tin compound to give the disadvantage that homogenization must be conducted again.

SUMMARY OF THE INVENTION

An object of the present invention is to overcome these disadvantages and provide a curing agent composition which can cure a condensation curable silicone elastomer uniformly, even in deep section, and which also has excellent stability during prolonged storage without separation of the water and the tin compound.

More specifically, the present invention provides a curing agent composition for silicone elastomers, comprising an organic tin compound which is solubilized in water with the use of a nonionic surfactant selected from the group consisting of polyoxyethylene sorbitol fatty acid esters and polyoxyethylene sorbitan fatty acid esters and a polyvalent alcohol.

DESCRIPTION OF THE INVENTION

The organic tin compound to be used in the present invention may include dibutyltin diacetate, dibutyltin di-2-ethylhexoate, dibutyltin dilaurate, dibutyltin maleate, dioctyltin dilaurate, dibutyltin oxide and the like.

In the present invention, as the nonionic surfactant, polyoxyethylene sorbitol fatty acid esters and polyoxyethylene sorbitan fatty acid esters may be employed. The polymerization degree of polyoxyethylene is preferably between 15 and 80, and a compound having a polymerization degree outside this range can hardly give a good solubilizing system. The number of fatty acids in the molecule is generally 4 in the case of polyoxyethylene sorbitol esters, while it is 1 or 3 in the case of polyoxyethylene sorbitan esters. Examples of fatty acids may be lauric acid, myristic acid, palmitic acid, stearic acid, oleic acid and mixtures thereof.

The amount of nonionic surfactant to be employed is preferably 5 parts by weight or more per 100 parts by weight of the organic tin compound. At a level less than 5 parts by weight, it is difficult to obtain a good solubilized state.

The polyvalent alcohol to be used in the present invention has the effect of improving the solubilizing power of the surfactant and to lower the viscosity of the solubilized state, and may be exemplified by ethylene glycol, diethylene glycol, propylene glycol, glycerine, diglycerine, sorbitol and the like. For these polyvalent alcohols to exhibit the effect mentioned above, the amount may preferably be 5 parts by weight or more per 100 parts by weight of the organic tin compound.

The content of water in the present curing agent composition is 10 to 70% by weight. At a level lower than 10% by weight, it is difficult to obtain a good solubilized state and sufficient deep section curability, while an amount in excess of 70% by weight can give sufficient effect with difficulty.

The curing agent composition of the present invention is generally prepared by formulating a nonionic surfactant and a polyvalent alcohol with an organic tin compound by mixing under stirring, and adding gradually a predetermined amount of water to the mixture while stirring.

Also, there poses no problem at all in adding fillers such as pigments, if necessary, to the composition of the present invention within a range which does not impair the object of the present invention.

The curing agent composition obtained by the present invention is not only excellent in stability over prolonged storage without separation of the water and the organic tin compound due to good solubilized state, but also excellent in workability, such as easy addition into a silicone composition as well as subsequent uniform dispersion and mixing. As the curing agent for silicone elastomers, it exhibits an excellent effect in curing of elastomers injected into the deep section of a thick molded article or narrow vacant spaces of instruments or constructions.

Further, it is also possible to set broadly the proportions of water among the components, whereby it is rendered possible to shorten to a great extent the time for deep section curing while maintaining the workable time. Such a characteristic is particularly advantageous when applied as a master mold.

EXAMPLES

The present invention is further described by referring to the following Examples and Comparative examples, in which all the parts are parts by weight.

The curing tests for silicone elastomers using the curing agent in the respective Examples were carried as follows.

Each curing agent was dispersed and mixed into the silicone composition, and a part of the mixture was placed in a test tube of 18 mm diameter and 180 mm length, followed by standing at 25° C. for 6 to 24 hours. Then, the test was stopped and the Shore hardnesses A at the top and the bottom of the sample were measured. Also, as the workable time, the amount of time from dispersion and mixing of the curing agent to gelation was measured.

EXAMPLE 1

[Preparation of curing agent compositions]

Curing Agent 1:

After 45 parts by weight of dibutyltin dilaurate, 18 parts of polyoxyethylene sorbitol tetraoleate (polymerization degree of polyoxyethylene: 60) and 12 parts of glycerine were mixed under stirring at 40° C., 25 parts of water were gradually added while continuing stirring. After completion of the addition, the mixture was stirred for an additional 5 minutes at 20° to 30° C. to obtain Curing Agent 1, which was a colorless and transparent liquid, solubilized in O/W type.

Curing Agent 2:

After 30 parts of dibutyltin diacetate, 12 parts of polyoxyethylene sorbitan monooleate (polymerization degree of polyoxyethylene: 20) and 14 parts of 70% aqueous solution of sorbitol were mixed under stirring at 20° to 30° C., 26 parts of water were gradually added while continuing stirring. After completion of the addition, the mixture was stirred at 20° to 30° C. for an additional 5 minutes to give Curing Agent 2, which is colorless and transparent, solubilized in O/W type.

Curing Agent 3:

After 40 parts of dioctyltin dilaurate, 15 parts of polyoxyethylene sorbitol tetraoleate (polymerization degree of polyoxyethylene: 30), 5 parts of polyoxyethylene sorbitol tetraoleate (polymerization degree of polyoxyethylene: 40) and 14 parts of propylene glycol were mixed under stirring at 20° to 30° C., 26 parts of water were gradually added while continuing stirring. After completion of the addition, the mixture was stirred at 20° to 30° C. for an additional 10 minutes to give Curing Agent 3, which is colorless and transparent, solubilized in O/W type.

EXAMPLE 2

To 100 parts of a hydroxy-terminated polydimethylsiloxane having a viscosity of 5,000 cP were added 40 parts of diatomaceous earth and 3 parts of a partial condensate of ethyl silicate, and the mixture was mixed by means of a universal kneader to prepare a silicone composition. To samples of this silicone composition were added the above Curing Agents 1, 2 and 3 as shown in Table 1, and the characteristics obtained are shown in Experiments No. 21, No. 22 and No. 23.

EXAMPLE 3

To 100 parts of a hydroxy-terminated polydimethylsiloxane having a viscosity of 3,000 cP were added 45 parts of pulverized silica and 2 parts of a partial condensate of ethyl silicate, and the mixture was mixed by means of a universal kneader to prepare a silicone composition. To samples of this silicone composition were added the above Curing Agents 1, 2 and 3 as shown in Table 1, and the characteristics obtained are shown in Experiments No. 31, No. 32 and No. 33.

COMPARATIVE EXAMPLE 1

A colorless and transparent Curing Agent 4 was prepared by mixing under stirring 100 parts of dibutyltin dilaurate, 50 parts of water and 320 parts of isopropanol. The characteristics obtained when this Curing Agent 4 was added to the silicone composition as in the above Example 2 are shown by the Experiment No. 101 in Table 1.

COMPARATIVE EXAMPLE 2

A W/O emulsion type Curing Agent 5 was prepared by stirring by means of a homogenizer 100 parts of dibutyltin dilaurate, 20 parts of water and 10 parts of Nonion NS-210 (trade name: produced by Nippon Oil & Fats Co.). The characteristics when this Curing Agent 5 was added to the silicone compositions as in the above Example 2 and Example 3 are shown by Experiments No. 201, No. 202 and No. 203.

COMPARATIVE EXAMPLE 3

A colorless and transparent Curing Agent 6 was prepared by mixing under stirring 100 parts of dibutyltin dilaurate and 100 parts of ethylene glycol. The characteristics when this Curing Agent 6 was added to the silicone composition as in the above Example 3 are shown by Experiments No. 301 and No. 302 in Table 1.

TABLE 1

| Experiment No. | The present invention | | | | | | Comparative example | | | | | |
| --- | --- | --- | --- | --- | --- | --- | --- | --- | --- | --- | --- | --- |
| | 21 | 22 | 23 | 31 | 32 | 33 | 101 | 201 | 202 | 203 | 301 | 302 |
| Polyorgano-siloxane (parts) | Hydroxy-terminated polydimethylsiloxane Viscosity 5,000 cP (100) | | | Hydroxy-terminated polydimethylsiloxane Viscosity 3,000 cP (100) | | | Hydroxy-terminated polydimethylsiloxane Viscosity 5,000 cP (100) | | | Hydroxy-terminated polydimethylsiloxane Viscosity 3,000 cP (100) | | |
| Additives (parts) | Diatomaceous earth (40) | | | Pulverized silica (45) | | | Diatomacious earth (40) | | | Pulverized silica (45) | | |
| | Partial condensate of ethyl silicate (3) | | | Partial condensate of ethyl silicate (2) | | | Partial condensate of ethyl silicate (3) | | | Partial condensate of ethyl silicate (2) | | |
| Curing agent (parts) | C.A.1*[1] (0.5) | C.A.2 (0.5) | C.A.3 (0.5) | C.A.1 (0.4) | C.A.2 (0.4) | C.A.3 (0.4) | C.A.4 (1.0) | C.A.5 (0.5) | C.A.5 (0.4) | C.A.5 (0.8) | C.A.6 (0.6) | C.A.6 (1.2) |
| Miscibility with silicone base | Easy | Easy | Easy | Easy | Easy | Easy | Difficult | Easy | Easy | Easy | Easy | Easy |
| Workable time (min) | 60 | 40 | 35 | 70 | 50 | 40 | 60 | 60 | 70 | within 30 | 40 | within 30 |
| Hardness after 6 hours: | | | | | | | | | | | | |
| Top | 55 | 55 | 55 | 41 | 41 | 41 | 53 | 54 | 40 | 40 | 40 | 40 |
| Bottom | 54 | 54 | 54 | 40 | 40 | 40 | 53*[2] | 18 | 0 | 12 | 0 | 7 |
| Hardness after 24 hours: | | | | | | | | | | | | |
| Top | 55 | 55 | 55 | 41 | 41 | 41 | 53 | 55 | 40 | 41 | 40 | 40 |
| Bottom | 55 | 55 | 55 | 40 | 40 | 40 | 53*[2] | 40 | 7 | 30 | 4 | 13 |

*[1]C.A. means Curing Agent.
*[2]Voids formed due to localized water droplets.

EXAMPLE 4

After Curing Agents 1, 2 and 3 had been stored at room temperature (25° C.) for one year, their appearances were observed. Each one was found to be a uniformly transparent solution. When 0.5 part of each Curing Agent was added to a silicone composition comprising 100 parts of a hydroxy-terminated polydimethylsiloxane (viscosity: 5,000 cP), 40 parts of finely divided calcium carbonate and 3 parts of a partial condensate of ethyl silicate, each composition was uniformly cured after 24 hours to a hardness of 35 at the top of sample and 34 at the bottom.

COMPARATIVE EXAMPLE 4

The appearance of Curing Agent 5 after storage at room temperature (25° C.) for one year was observed to be separated into two layers. When 0.5 part of this curing agent was added to the silicone composition obtained in Example 4, the composition was cured after 24 hours to a hardness of 33 at the top of sample and 0 at the bottom.

We claim:

1. A curing agent composition for silicone elastomers, comprising an organic tin compound which is solubilized in water with the use of a nonionic surfactant selected from the group consisting of polyoxyethylene sorbitol fatty acid esters and polyoxyethylene sorbitan fatty acid esters and a polyvalent alcohol.

2. A curing agent composition according to claim 1, wherein the nonionic surfactant is a polyoxyethylene sorbitol fatty acid ester.

3. A curing agent composition according to claim 1, wherein the water content in the composition is 10 to 70% by weight.

* * * * *